(12) United States Patent  (10) Patent No.: US 7,767,930 B2
Wilbanks et al.                (45) Date of Patent:  Aug. 3, 2010

(54) METHOD AND SYSTEM FOR LASER MACHINING

(75) Inventors: Thor Miller Wilbanks, Berkeley, CA (US); Jeffrey A. Schuster, Oakland, CA (US)

(73) Assignee: Aradigm Corporation, Hayward, CA (US)

( * ) Notice: Subject to any disclaimer, the term of this patent is extended or adjusted under 35 U.S.C. 154(b) by 857 days.

(21) Appl. No.: 11/542,625

(22) Filed: Oct. 2, 2006

(65) Prior Publication Data

US 2007/0075063 A1      Apr. 5, 2007

Related U.S. Application Data

(60) Provisional application No. 60/723,382, filed on Oct. 3, 2005.

(51) Int. Cl.
    B23K 26/00    (2006.01)
(52) U.S. Cl. ............... 219/121.71; 219/121.62; 219/121.74; 219/121.83
(58) Field of Classification Search ............. 219/121.7, 219/121.71, 121.62, 121.76, 121.77, 121.83, 219/121.68, 121.69, 121.74
    See application file for complete search history.

(56) References Cited

U.S. PATENT DOCUMENTS

| | | | |
|---|---|---|---|
| 3,986,767 A * | 10/1976 | Rexer et al. ............ | 219/121.74 |
| 4,430,549 A * | 2/1984 | Macken ................. | 219/121.74 |
| 4,508,749 A | 4/1985 | Brannon et al. | |
| 4,924,321 A | 5/1990 | Miyagawa et al. | |
| 5,037,183 A * | 8/1991 | Gagosz et al. .......... | 219/121.7 |
| 5,268,554 A | 12/1993 | Ream | |
| 5,497,763 A | 3/1996 | Lloyd et al. | |
| 5,544,646 A | 8/1996 | Lloyd et al. | |
| RE35,446 E | 2/1997 | Stone | |
| 5,660,166 A | 8/1997 | Lloyd et al. | |
| 5,705,788 A | 1/1998 | Beyer et al. | |
| 5,709,202 A | 1/1998 | Lloyd et al. | |
| 5,718,222 A | 2/1998 | Lloyd et al. | |
| 5,823,178 A | 10/1998 | Lloyd et al. | |
| 5,829,435 A | 11/1998 | Rubsamen et al. | |

(Continued)

FOREIGN PATENT DOCUMENTS

JP      55-81095 A  *  6/1980

(Continued)

OTHER PUBLICATIONS

Machine translation of Japan Patent No. 2001-38,479, Dec. 2009.*

(Continued)

*Primary Examiner*—Geoffrey S Evans
(74) *Attorney, Agent, or Firm*—Karl Bozicevic; Bozicevic, Field & Francis LLP (57) ABSTRACT

The invention provides a method of rapidly machining multiple, often similar or nearly identical, features using a LASER machining system. During LASER machining, light of a wavelength and intensity that will modify the workpiece to be machined is directed at the workpiece and interacts to produce the desired change. If several features are to be machined, the processing speed can be increased by operating on a multiplicity of features at once. In one embodiment of the invention, this is achieved by separating the LASER beam into multiple beams and machining the desired features simultaneously.

11 Claims, 7 Drawing Sheets

U.S. PATENT DOCUMENTS

| | | | |
|---|---|---|---|
| 5,837,962 A * | 11/1998 | Overbeck | 219/121.75 |
| 5,882,572 A | 3/1999 | Lutze et al. | |
| 6,130,405 A | 10/2000 | Loringer | |
| 6,183,064 B1 * | 2/2001 | Murthy et al. | 219/121.76 |
| 6,426,840 B1 | 7/2002 | Partanen et al. | |
| 6,447,125 B1 * | 9/2002 | Huonker et al. | 219/121.62 |
| 6,624,885 B1 | 9/2003 | Pon et al. | |
| 6,625,181 B1 | 9/2003 | Oshemkov et al. | |
| 6,726,312 B1 * | 4/2004 | Fujimura et al. | 347/47 |
| 6,822,191 B2 | 11/2004 | De Steur et al. | |
| 6,857,365 B2 | 2/2005 | Juffinger et al. | |
| 2001/0040151 A1 | 11/2001 | Isaji et al. | |
| 2001/0045419 A1 | 11/2001 | Dunsky et al. | |
| 2002/0040893 A1 | 4/2002 | Arai et al. | |
| 2002/0139786 A1 | 10/2002 | Amako et al. | |
| 2002/0148818 A1 | 10/2002 | Satou et al. | |
| 2002/0158051 A1 | 10/2002 | Heitel et al. | |
| 2003/0006220 A1 | 1/2003 | Cummings et al. | |
| 2003/0111447 A1 | 6/2003 | Corkum et al. | |
| 2003/0116545 A1 | 6/2003 | Kaji | |
| 2003/0155328 A1 * | 8/2003 | Huth et al. | 219/121.7 |
| 2003/0201578 A1 | 10/2003 | Li et al. | |
| 2004/0070754 A1 | 4/2004 | Schuster et al. | |
| 2005/0045604 A1 | 3/2005 | Talwar | |
| 2007/0051707 A1 * | 3/2007 | Elfizy | 219/121.71 |

FOREIGN PATENT DOCUMENTS

| | | | |
|---|---|---|---|
| JP | 63-108980 A * | 5/1988 | |
| JP | 03 124387 | 5/1991 | |
| JP | 11 058055 | 3/1999 | |
| JP | 2001-38479 A * | 2/2001 | |
| JP | 2001-71159 A * | 3/2001 | |
| JP | 2001-259871 A * | 9/2001 | |
| JP | 2001 274557 | 10/2001 | |
| JP | 2002 273590 | 9/2002 | |
| JP | 2004-34121 A * | 2/2004 | |

OTHER PUBLICATIONS

Machine translation of Japan Patent No. 2001-71,159, Dec. 2009.*
Machine translation of Japan Patent No. 2001-259,871, Dec. 2009.*

* cited by examiner

METHOD AND SYSTEM FOR LASER MACHINING

CROSS-REFERENCE

This application claims the benefit of U.S. Provisional Application No. 60/723,382, filed Oct. 3, 2005, which application is incorporated herein by reference noting that the current disclosure governs with respect to any differences with the provisional application.

FIELD OF THE INVENTION

The present invention relates to methods of and systems for LASER machining. More specifically, it relates to increasing processing speed and quality by multiplexing a LASER machining beam in either space or time while measuring a response and modifying the operating parameters of the multiplexed beams.

BACKGROUND OF THE INVENTION

In different areas of technology it is desirable to make use of a thin sheet of material which has an array of regularly spaced, very small holes therein. For example, such might be used in the manufacture of various electronic components. Thin sheets which have one or more holes in them could also be used in the formation of components used in ink jet printers or fuel injectors. A more direct application of such a pore array is as a filter. The pore size and pore density could be adjusted to wide range of filter applications. Alternatively, liquid formulations containing a drug could be moved through such a porous member to create an aerosol for inhalation.

One of the gentlest and most acceptable methods of administering an agent to a patient is via aerosol. Aerosol therapy can be accomplished by aerosolization of a formulation (e.g., a drug formulation or diagnostic agent formulation) and administration to the patient, for example via inhalation. The aerosol can be used to treat lung tissue locally and/or be absorbed into the circulatory system to deliver the drug systemically. Where the formulation contains a diagnostic agent, the formulation can be used for diagnosis of, for example, conditions and diseases associated with pulmonary dysfunction.

In general, aerosolized particles for respiratory delivery have a diameter of 12 micrometers or less. However, the preferred particle size varies with the site targeted (e.g., delivery targeted to the bronchi, bronchia, bronchioles, alveoli, or circulatory system). For example, topical lung treatment can be accomplished with particles having a diameter in the range of 1.0 to 12.0 micrometers. Effective systemic treatment requires particles having a smaller diameter, generally in the range of 0.5 to 6.0 micrometers, while effective ocular treatment is adequate with particles having a diameter of 15 micrometers or greater, generally in the range of 15-100 micrometers.

U.S. Pat. Nos. 5,544,646, 5,709,202, 5,497,763, 5,544,646, 5,718,222, 5,660,166, 5,823,178 and 5,829,435 describe devices and methods useful in the generation of aerosols suitable for drug delivery. These devices generate fine, uniform aerosols by passing a formulation through a nozzle array having micrometer-scale pores as may be formed, for example, by LASER ablation.

Pore arrays having such small features can be difficult and costly to manufacture. Additionally, the pores must be of high quality and uniformity where they are to be used (1) in manufacturing electronic components; (2) in filter materials; (3) in ink jet printers; (4) in fuel injectors; and (5) to create aerosols for delivering therapeutic agents to patients in order to insure that the patients consistently receive the therapeutically required dose. Consequently, there is a need for a fabrication method and an inspection method which can rapidly manufacture and analyze porous samples of small dimensions to determine various parameters including pore size and pore density, and with the ability to adjust such parameters to produce a pore array having high quality and uniform pores. In the preferred embodiment, the manufacture and analysis are done simultaneously by monitoring the beam as it drills through the part.

In most cases it is desirable to increase the rate at which a process can produce output. Although this invention was developed in part by an evaluation of LASER drilling microscopic holes, nothing in the motivation, analysis, or applications necessarily limits the scope to drilling, micromachining, or even to LASER processing.

Presently, LASERs are used to drill holes in a variety of materials for a variety of purposes. In particular, ultraviolet LASERs are used to drill micro-vias in multi-layer electronic circuits and in polymer films for such applications as ink-jet printer nozzles (cf U.S. Pat. No. 4,508,749) and aerosol drug delivery. This process is frequently implemented using an excimer LASER and a mask and projection system to drill multiple holes at once.

There are several disadvantages to this approach. Excimer LASERs generally have intensive energy and utility (cooling and venting) requirements, and the incoherent nature of the beam makes mask and projection the most viable method of multiplexing the beam. The use of a masking system usually involves discarding much of the LASER energy, and in many cases of LASER hole drilling as much as 99% of the LASER power is stopped by the mask and not used for the drilling process. In addition, the non-uniform output beam generally seen with excimer LASERs usually requires the use of homogenizers, and even then this technology has uniformity limitations.

It is difficult to drill holes with exit diameters less than 1 micrometer using the process as described in U.S. Pat. No. 4,508,749. An improvement to this process was introduced in U.S. Pat. No. 6,624,885 and U.S. Publication No. US-2004-0070754-A1, published Apr. 15, 2004 that allows smaller holes to be drilled. It is difficult to achieve good beam homogeneity across excimer LASER beams, and beam power variations can also be introduced when multiplexing other types of LASERs. Thus, this control method faces limitations in feature-to-feature (hole-to-hole) uniformity within multiple feature arrays machined in a single operation.

Although the feedback control method of U.S. Pat. No. 6,624,885 can be applied to a process that drills only one hole at a time, this seriously limits the production speed of such a process due to the requirement to step the target or beam from hole to hole, and then allow for settling time.

The process with feedback control implemented might be sped up in one of at least three ways without fundamentally changing the process. The rate of LASER pulsing can be increased, the time to step from one feature to the next can be decreased, or the number of features machined at once can be increased with individual feedback applied to each of the features. Although excimer LASERs are limited to a few hundred pulses per second, some solid-state UV LASERs (Lambda Physik Gator, Coherent Avia) can pulse as many as 100,000 times per second or more. This could result in speeding the process up by more than 100 times. However, it also reduces the time between pulses from more than 1 millisecond to only 10 microseconds. Some LASER drilling processes produce a small cloud of plasma with each LASER pulse and it may be that this plasma cloud, if not allowed time to dissipate, will modify the drilling process by attenuating or reflecting the LASER beam.

It may be more desirable to maintain the rate at which pulses reach each feature but increase the number of features drilled at the same time. However, as this discussion indicated, spatially multiplexing the beam can result in non-uniformity between the individual features within the multiplicity, and it can be difficult to control the characteristics of the individual features. It is possible to use a detector with spatial resolution to monitor the progress of the process for each feature. However, for the nozzles used in aerosol drug delivery, this may require independently controlling hundreds of LASER beams based on the feedback from a detector with hundreds or thousands of elements. In addition, machining a large array at once may in itself lead to plasma shielding effects. Despite these difficulties, a dynamic beam-splitter based on an acousto-optic modulator driven at many frequencies at once could split the beam into dozens or hundreds of beams, and the individual beams could be turned on or off (based on information from a feedback detector) by modifying the multi-frequency drive signal. This method could be used independently or in combination with the other methods disclosed and described here.

A large improvement in fabrication time can be achieved by rapidly switching a single beam from one feature to another. Using standard staging to move a target piece from one feature to another can require on the order of 100 ms to move and settle, and as a result, machining a part such as a nozzle array containing hundreds of nozzles can take on the order of a minute to complete. This time can be reduced to a few seconds by using galvanometer mirrors, or galvos. Acousto-optic modulators (AOMs) are capable of moving a beam from one position to another in approximately 1 microsecond, and can be used to reduce the amount of time moving between features to a negligible fraction of the fabrication time. Two dimensional arrays of features can be fabricated by using two galvos, two AOMs, or in a preferred embodiment, one AOM and one galvo. In addition, the progress of the individual holes can be monitored with a detector and the drilling process can be adjusted or terminated based on this monitoring. For example, the detector can be place behind the part being modified, and when the beam has created a through hole, a property of the LASER light transmitted through the piece, for example its intensity, can be measured, and the process can be modified or terminated based on this measurement. The detector can have a temporally resolved response so that the properties of each sequential pulse can be determined, and then the process can be adjusted or terminated for that hole when appropriate.

The number of features being machined can also be increased by multiplexing the drilling operation in time, directing sequential LASER pulses at the multiplicity of features to be machined. For instance, a series of 100 pulses from a 100,000 kHz pulse train can be directed sequentially at a series of 100 holes to be drilled, and then the process can be repeated. In this example, each individual hole receives pulses at only 1 kHz, allowing time for the plasma cloud to dissipate before the next pulse. An advantage of this is that the beam can be scanned continuously, rather than in step and repeat fashion, eliminating the time delays associated with acceleration, deceleration, and settling. In addition, the progress of the individual holes can be monitored with a detector and the drilling process can be adjusted or terminated for each hole individually. The detector can have a temporally resolved response so that the properties of each sequential pulse can be determined and associated with the feature at which that pulse was directed, and then the process can be adjusted or terminated for that hole when appropriate. Alternatively, the detector can have a spatially resolved response so that the progress of the drilling at each location can be determined. In either case, once a hole is determined to be substantially complete, the pulses that would continue to drill that hole can be omitted from the LASER pulse train.

Implementing this control scheme requires: a method of scanning the LASER beam (that is, directing sequential LASER pulses at sequential features), a method of detecting the progress of drilling on the individual holes, and a controller that analyzes the detection, synchronizes the pulses, scanning and detection, and a controller to generate and omit pulses and control the scanning of the beam as needed.

A number of types of high-speed scanning systems exist. LASER printers typically use a spinning polygonal mirror to scan a LASER beam across the print copy thousands of times per second. Many LASER machining systems use mirrors mounted on high-speed galvanometers to scan the machining LASER beam across the work piece at similar frequencies. Acousto-optic modulators, already used for spectrometers, LASER Q-switches, and some LASER scanning systems can achieve even higher frequencies.

Aspects of spatially multiplexing LASER beams used for processing is referred to in U.S. Pat. No. 6,625,181 which uses a fixed beamsplitter configuration, beam modulation after beamsplitting without feedback.

SUMMARY OF THE INVENTION

A method of machining a component is disclosed. The method first involves creating an energy beam which may be a LASER beam or other energy beam capable of processing a component. The energy beam or LASER beam is then split into a plurality of sub-beams. The sub-beams are focused on individual features of a component to be machined. A sensor is used to detect energy from the sub-beams which are focused on the features. By analyzing the energy detected by the sensor it is possible to create a signal, such as signal of digital information. The signal is sent to a device which controls the energy beam or LASER beam and thereby controls the machining of the component. For example, when the sensor detects that a sub-beam has drilled a hole of the pre-specified quality, for example size of opening, shape and depth, into a component, the LASER is deactivated or the sub-beam used in creating that feature is discontinued.

A part to be modified by a LASER process or other energy source can be processed more rapidly and precisely by modifying the process in one or more of the following ways: (1) directing the LASER beam at more than a single feature while features are being processed, (2) decreasing the amount of time required to move the beam from feature to feature, (3) increasing the amount of power delivered to the part, preferably by increasing the repetition rate of a pulsed (q-switched) LASER without changing the properties of individual LASER pulses (4) detecting the progress of the process on individual features or subgroups of features, (5) analyzing the progress detected, and (6) modifying or terminating the process on individual features or subgroups of features in response to the information obtained by monitoring the progress of the process.

The system implementing this must have (1) a LASER controller than causes the LASER to operate appropriately for the process, (2) a beam splitter or scanner to direct the beam at a multiplicity of features either (a) simultaneously or (b) sequentially, (3) a detector to monitor the progress of the LASER processing on the individual features or subgroups of features, (4) an analysis apparatus, circuit, or computer to convert the detected information into an appropriate change in the process parameters for those individual features or subgroups of features, and (5) a synchronizing control system that can apply the changes to the processes applied to those individual or subgroups of features.

A method of machining is disclosed. The method comprises sequentially applying energy to a multiplicity of areas where a feature is to be machined into the area and repeating the sequential application of energy to the area thereby allowing a multiplicity of features to be machined into the multiplicity of areas essentially at the same time. Although different types of energy beams may be used a LASER is preferred and particular types of LASERs are preferred in particular situations.

In another aspect of the invention the method is carried out wherein the LASER is directed from one area to another area by an element chosen from a spinning element, a vibrating element and an oscillating element. The spinning element may be a polygonal mirror. The oscillating element may be an oscillating optical element and the oscillating optical element may be driven by an electromechanical actuator which actuator may be a galvanometer or a piezoelectric element.

A component comprising features made by any method disclosed and claimed here is part of the invention such as components where the features are holes for nozzles for aerosolization. The component may be nozzles having exit apertures from about 0.1 micrometer to about 10 micrometer in diameter.

Another aspect of the invention is a component with a multiplicity of features on it which component has been produced by a method as described above or claimed in the claims. The component may be a nozzle which is comprised of a thin sheet of material used for aerosolization of a pharmaceutically active formulation. The nozzles produced may have exit apertures having a diameter of from about 0.1 micrometers to about 10 micrometers. The nozzles may have exit apertures from about 0.4 micrometers to about 1.4 micrometers.

Another aspect of the invention is a nozzle fabricated from a two-step process as described herein. The first step may comprise the application of pulses of largely the same energy to an aera where a feature is to be created. A predetermined number of pulses may be delivered. Thereafter, the second step comprises delivering pulses of largely the same energy to the same area where the pulse features are to be created until a feedback circuit determines that the fabrication is complete.

In accordance with the above method of fabricating the nozzle the pulse of energy used in step 1 may be used in a range 0.1 to 3.0 uJ and the pulses in the first step may be from 1-100 and the pulse energy used in the second step may be in the range of 0.5 to 3.0 uJ.

In accordance with the above nozzle fabrication method in two steps a feedback circuit may be used for measuring the transmitted power through the sheet where the holes are being formed to create the nozzle. The feedback may trigger termination of the process when the energy pulse transmitted is 0.1 picojoule to 10 nanojoule. Alternatively, the feedback circuit may terminate the process when the energy per pulse is determined to be in a range of 1-1,000 picojoule. Still further, the feedback circuit may be designed to terminate the process when the energy determined at a feature is in a range of 10-200 picojoules per pulse. Still further, the two step process of the invention may be carried out where the energy pulse in step 1 is 1:0.5-2.5 uJ and pulses in the first step are in the range of 5-50 and the energy per pulse is in the range of about 22:0.1-1.0 uJ.

The two step process for producing the nozzles as described above may be carried out so that the exit diameter of the nozzle is less than about 10 micrometers or less than about 2.5 micrometers or less than 1 micrometer.

These and other aspects of the invention will become apparent to those persons skilled in the art upon reading the details of the formulations and methodology as more fully described below.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures:

FIG. 1 is a schematic drawing of an embodiment of the present invention using spatial multiplexing with an AOD and a multi element detector for feedback control.

FIG. 2 is a schematic drawing of another embodiment of the present invention utilizing a spinning polygon with scan detector on the primary beam to scan the beam repeatedly over a series of holes to be drilled.

FIG. 3 is a schematic drawing of another embodiment of the present invention utilizing a spinning polygon mirror with scan detector on an auxiliary beam to scan the beam repeatedly over a series of holes to be drilled.

FIG. 4 is a schematic drawing of another embodiment of the present invention utilizing an oscillating mirror with scan detector on the primary beam to scan the beam repeatedly over a series of holes to be drilled.

FIG. 5 is a schematic drawing of another embodiment of the present invention utilizing an oscillating mirror with scan detector on an auxiliary beam to scan the beam repeatedly over a series of holes to be drilled.

FIG. 6 is a schematic drawing of another embodiment of the present invention utilizing an acousto-optic element to scan the beam repeatedly over a series of holes to be drilled.

FIG. 7 is a schematic drawing of another embodiment of the present invention utilizing an acousto-optic element with scan detector on the primary beam to scan the beam repeatedly over a series of holes to be drilled.

DETAILED DESCRIPTION OF THE INVENTION

Before the present formulations and methods are described, it is to be understood that this invention is not limited to particular formulations and methods described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a formulation" includes a plurality of such formulations and reference to "the method" includes reference to one or more methods and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

Definitions

The terms "acousto-optic modulator," "acousto-optic element," "acousto-optic Deflector", "AOD", "AOM", and the like are used interchangeably and will be interpreted herein to be an optical element that can be excited with acoustic (pressure) waves in order to diffract the light that traverses the element. Essentially constant frequencies can be used to create single beams that are diffracted into known angles, or more complex frequency spectrums, such as multiple closely spaced frequencies, harmonics, or more complex excitation signals can be used. The amplitude of the excitation can control the fraction of the laser light being deflected, and the amount of LASER energy in the single beam(s). Two dimensional patterns can be created with two dimensional excitations, or by using multiple acousto-optic elements. Additional multiplexing can be achieved by utilizing higher orders of diffracted beams. Many materials can be used for the optical element, although preferred materials are quartz crystals and $TeO_2$.

An acousto optic element may comprise optically transparent acousto optic medium having light incoming plane, light outgoing plane facing light incoming plane, transducer joining plane, and inclined plane tilted to transducer joining plane and piezoelectric transducer on which two opposing planes i.e., electrode layers and are formed and the transducer is connected to transducer joining plane of acousto optic medium through one of the electrode layers, wherein a deposited layer or a coating layer is formed on at least one of ultrasonic transducer or the acousto optic medium, the layer preventing ultrasonic waves generated by oscillation of ultrasonic transducer leaking onto acousto optic medium as a leakage-ultrasonic wave and propagating there, thus obtaining a high light-fading ratio as shown in U.S. Pat. No. 7,054,055 which is incorporated herein by reference.

The terms "galvanometer", "galvo" and the like are here used interchangeably and will be interpreted to mean an electrical means of rapidly and accurately moving an optical mirror from one position to a second position. Although classically a galvanometer is moved through a fixed angle by the force of a current through a coil acting on a magnet attached to the mirror, many ways of actuating the mirror can be implemented, including piezo actuators.

The term "LASER" and "LASER beam" and the like are used interchangeably and will be interpreted to be any source of electromagnetic radiation which is essentially monochromatic or comprises essentially a frequency of electromagnetic radiation and some harmonics or sub-harmonics. Examples of LASERs include but are not limited to Excimer LASERs, gas LASERs (including Helium-Neon, Argon, and $CO_2$ LASERs), YAG and YLF LASERs, frequency multiplied YAG and YLF LASERs (including frequency doubled, tripled, and quadrupled versions), diode lasers, and fast, ultrafast, short-pulse and ultra-short pulse LASERs. It will be obvious to one skilled in the art that other directed energy sources could often be used in place of a LASER system, and disclosure of processes where a LASER is used as an example should be considered to include these other energy sources.

The term "closed-loop", "closed loop feedback" and the like are used interchangeably and will be interpreted herein to apply to a process that is modified or terminated based on information about the progress or state of the process. This is in contrast to a process that is run "open-loop", e.g. when a hole is drilled with a specific number of pulses of a specified energy per pulse. The analogous closed-loop drilling process might be when a hole is drilled with a multiplicity of pulses of a specified energy and the drilling is terminated not at a specific number of pulses but when a certain amount of the energy from a pulse is detected having penetrated the material being drilled. In the preferred embodiment, a hybrid method is used, wherein the part is processed for a fixed number of pulses, and then a property of the energy source is changed, for example the energy per pulse, and then the feature is completed using the feedback method.

The terms "detector", "light detector" and the like are used interchangeably and will be interpreted herein to be any device used to measure any property of incident light, including but not limited to energy, power, amplitude, phase, polarization, wavelength, beam width, radius of curvature, coherence, or propagation direction. Examples of detectors include array detectors such as CCD arrays, single element detectors such as semi-conductor, photo-multiplier tube, micro-channel plate, bolometer, pyroelectric or thermoelectric detectors, or other device or material. Although it is preferable that the detector convert incident energy into electric current, it could also be possible to use mechanical means or other means of controlling process parameters based on properties of incident light.

The terms "spinning polygonal mirror" and the like shall mean a structure with at least 2 non co-planar reflective surfaces that is caused to rotate in a substantially uniform manner. Preferably the surfaces are aligned such that as a LASER beam ceases to be incident on a first surface, and becomes incident on the next surface, due to the rotation, the reflected beam is caused to traverse substantially the same path as while the beam was incident on the first surface. Multiple rows of facets, or multiple beams incident on a single row from multiple directions, can be used to simultaneously fabricate multiple rows of features.

General Overview

Figure 1:
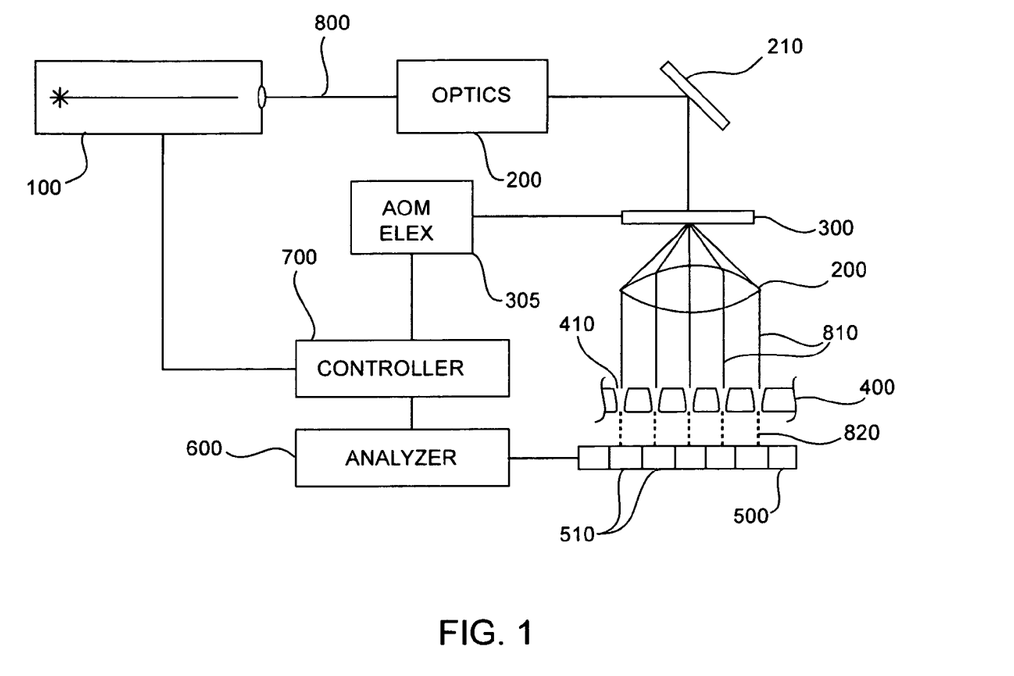
Figure 2:
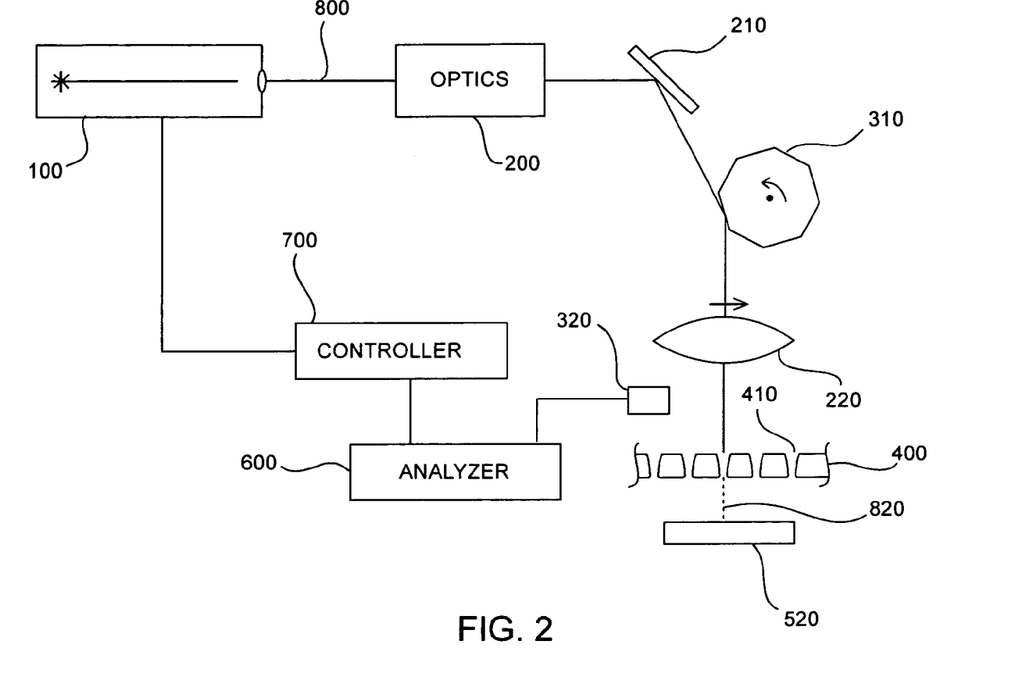
Figure 3:
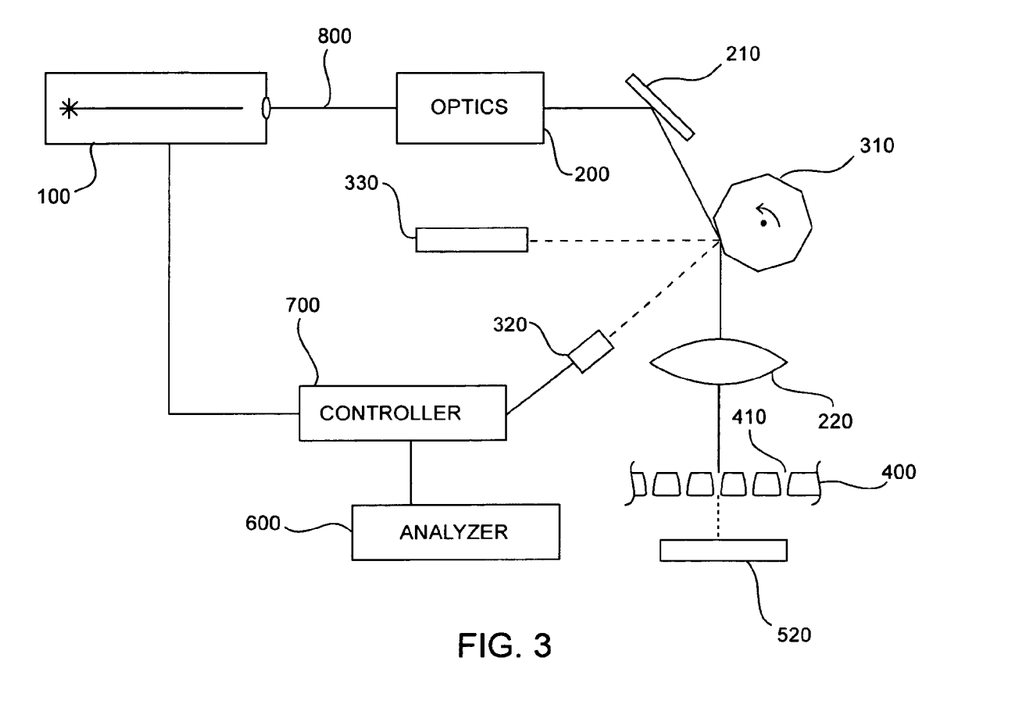

The invention provides a method of more rapidly machining multiple, preferably similar or nearly identical, features using a LASER machining system. During LASER machining, light of a wavelength and intensity that will modify the workpiece to be machined is directed at the workpiece and interacts to produce the desired change. If several features are to be machined, the processing speed can be increased by processing a multiplicity of features simultaneously, increasing the incident power, increasing the pulse repetition rate, or increasing the rate at which the LASER beam is moved from one feature or group of features to the next. In one embodiment of the invention, this is achieved by separating the LASER beam into multiple beams and machining the desired features simultaneously (FIG. 1). To achieve the characteristics desired of the features in these cases, an array (500) of detectors (510) or an array detector (500) can be used to monitor the process on individual features or subgroups of features (410) and to modify the process to ensure the desired results. Alternatively, a single detector (500) may be used. In one embodiment, a number of pulses are directed simultaneously to multiple locations on the target. The number of pulses can be a predetermined, fixed number, or can be based on a readout of the feedback detector reaching a predetermined state or threshold. At this time, the beam is delivered sequentially to at least some features, preferably to each feature individually, and at least one property of these at least some features is determined. Based on this determination, the process is modified, by changing at least one property of the incident light, or preferably, eliminating the power, delivered to a subset or all of the features, and the process may be iterated until all features are determined to be adequately processed.

In another embodiment, the LASER beam is separated into multiple segments in time and those segments are directed sequentially at the multiple features to be machined. The LASER beam can process a single feature until the processing is completed, and then be directed toward the next feature. Alternatively the laser can be directed for toward a single feature for a limited number, or preferably one, pulse(s). This embodiment has the advantage when there is some limit on the processing rates for the interaction of the LASER beam with the work piece. One example of this is when a plasma plume results from the ablation of material from a surface subsequently blocking the machining LASER beam, and requiring that there be sufficient time allowed between pulses of the LASER beam for the plasma to dissipate. This embodiment also has the advantage that the beam or target can be translated continuously, eliminating the time associated with acceleration, deceleration, and settling. In this embodiment, one can unsure the quality of the features using either an array of detection elements, which provide spatial resolution on the process, or preferably an individual detector, which provides temporally resolved data on the sequence of features being drilled. This information can be used to modify the process to ensure that the individual features possess the characteristics desired.

In another embodiment, the LASER beam is directed at a single spot on the target. The LASER beam micro-machines a feature, preferably a nozzle hole, more preferably a nozzle hole for aerosol drug delivery. When at least one feature of the hole is determined to be sufficiently formed by a feedback detector, the LASER beam is very rapidly moved to the position of the next feature in a row of features to be micromachined. This is repeated until the entire row of features is complete. The beam may rapidly moved from one feature to the next using a variety of techniques known to those skilled in the art, including but not limited to stages, galvanometers, or preferably an acousto-optic modulator. The fabrication may be completed by delivering a train of relatively constant energy pulses to the target, until the fabrication is stopped based on a measurement by the feedback detector. Preferably the energy of the pulses changes during the micromachining. The energy can change in a relatively continuous manner, can change in step wise fashion, or combinations thereof. In a preferred embodiment, a fixed number of pulses is delivered to the target material, the energy per pulse is changed to a different, preferably lower, level, and then the fabrication is allowed to continue until the feedback detector signal is used to determine that at least one property of the feature, preferably the size, has been met a pre-specified value. The amount of light transmitted depends strongly on the size and somewhat on the shape of the hole created, and thus holes of roughly the same shape and will be very close to the same size if they were completed when they transmitted roughly the same amount of light. Holes drilled with this feedback may have standard deviation in hole size of only a few percent, compared with more than 10% for holes drilled without feedback. Once the row is complete, the beam, or the part, is moved to the position of the next row. Preferably this move is approximately perpendicular to the first row. This move can be accomplished by methods including, but not limited to a stage, an acousto-optic modulator, or preferably a galvanometer. This process is repeated until the entire array has been fabricated. In order to minimize the time required to fabricate the array, a LASER repetition rate of 30 kHz to 600 kHz should be used, preferably 60 kHz to 300 kHz, more preferably about 100 kHz. Use of high repetition rates and rapid scan methods can lead to a time to fabricate the array of features of less than 25 milliseconds per feature, preferably less than 10 milliseconds, more preferably less than about 3 milliseconds. Using the feedback method, it is possible to fabricate arrays comprising nozzles with exit diameters less than about 10 micrometers, preferably less than about 5 micrometers, more preferably less than about 2.5 micrometer, still more preferably less than about 1 micrometer.

The AOD is driven with a radio frequency wave in the range of 10 MHz to 1 GHz. A quartz AOD is preferably driven with a radio frequency wave in the frequency range from 70 to 135 MHz. An AOD made with a $TeO_2$ crystal might also be used, in which case a synthesizer operating at lower frequencies (35-70 MHz) would be used.

If the move in the secondary, transverse direction is performed with the galvanometer, a part with a few hundred holes, appropriate for aerosolization of pharmaceutical formulation for inhalation, typically takes 0.6-0.7 seconds to complete. If the stage is used to move in the transverse direction, the slower move and settle time results in drilling times around 2.5 seconds, dominated by the stage movements. If the stage is used to move the parts in both directions and the AOD is used only to modulate the energy per pulse in the appropriate sequence, parts take 20-30 seconds to complete, entirely dominated by the time required for hundreds of stage movements.

Nozzles can fabricated using a one step process, a two step process, more than two steps, or a continually varying pulse energy. In the one step process, pulses of largely the same pulse energy are applied to the part until the feedback system determines that the fabrication is complete. For the two step process, the first step preferably comprises application of pulses of largely the same energy to the part for a fixed, predetermined number of pulses. The second step comprises delivery of pulses of largely the same energy to the part until the feedback circuit determines that the fabrication is complete. The two step process has two advantages over the one step process. Firstly, the fabrication process is more rapid, as a large portion of the nozzle is drilled rapidly at high power, only dropping to the smaller power to drill a very small, controlled exit hole. Secondly, the higher power first step results in a larger diameter for much of the length of the nozzle, resulting in lower pressure required for aerosolization.

Single Step Process:

Pulse energy: about 0.1-3.0 uJ, or preferably about 0.2-1.5 uJ, or more preferably about 0.45 uJ Average pulses required: about 30-500, preferably 80-200, more preferably 120-180

Energy per pulse transmitted at desired hole size: about 0.1 picojoule to 10 nanojoule, preferably 1-1000 picojoule, more preferably about 10-200 picojoule.

Hole entrance size generated: 3-30 um, preferably, 6-20 um

Hole exit size generated: about 0.2-15 um, preferably 0.3-2 um, more preferably 0.4-0.6 um Two Step Process:

Pulse energy, step 1: about 0.1-3.0 uJ, preferably about 0.5-2.5 uJ, more preferably about 1.5 uJ Number of pulses, first step: about 1-100, preferably about 5-50, more preferably about 10-30, most preferably about 20

Pulse energy, step 2: about 0.05-3.0 uJ, preferably about 0.1-1.0 uJ, more preferably about 0.15-0.5 uJ, most preferably about 0.2-0.25 uJ Number of pulses, step 2: about 1-1000, preferably 10-500, more preferably 30-200, most preferably 50-200

Energy per pulse transmitted to feedback detector at desired hole size: about 0.1 picojoule to 10 nanojoule, preferably about 1-1000 picojoule, more preferably 10-200 picojoule.

Hole entrance size generated: 3-30 um, preferably, 6-20 um

Hole exit size generated: about 0.2-15 um, preferably 0.3-2 um, more preferably 0.4-0.6 um The present invention can be used to fabricate arrays of pores in a sheet of material. The material can be any material that can be processed by LASERs, including but not limited to metals, ceramics, glasses, and polymers. Many polymers can be used, including but not limited to polyesters, polycarbonates, and polyetherimides. In the preferred embodiment, the material is a polyimide film. The sheet can have any thickness, but is preferably from about 10 μm to about 200 μm, more preferably from about 10 μm to about 50 μm, most preferably about 25 μm thick. The pores to be formed using the present invention can have any size and shape. For aerosolization nozzles, they have exit apertures ranging from about 0.1 to about 50 micrometers, preferably about 0.3 to 10 micrometers in diameter. For pulmonary drug delivery, the exit apertures will in general range from about 0.1 micrometer to about 10 micrometer, preferably from about 0.3 micrometer to about 2.5 micrometer, more preferably from about 0.4 micrometer to about 1.4 micrometer in diameter. The pores can have any shape, including roughly conical shapes, cylindrical shapes, or combinations thereof. In the preferred embodiment, the pores are roughly conical, with the exit being smaller than the entrance. The exit of the pore can have any shape, but is preferably approximately circular.

The beams delivered to the sheet may have any radial shape including but not limited to substantially circular and may be characterized by any appropriate profile including but not limited to roughly gaussian or top-hat profiles. Any suitable number of pores or holes may be formed including from a few holes to several hundreds or more.

In a first embodiment (FIG. 1) a LASER (100) generates a LASER beam (800) which flows through optics (200). The beam (800) may be directed by a mirror (210) to a beam splitter (300). The plurality of individual LASER beams (810) then flow through a lens (220) before being directed at individual features (410) of a component (400) which is being machined. The features (410) may be holes being drilled in a component (400) which is a sheet, preferably a polymer membrane. The controller (700) repeatedly actuates the LASER (100) sending rapidly repeating LASER pulses at the features (410). In this embodiment the pulses are repeated until the detector (500) with special detection components or special resolution features (510) detect the transmitted LASER pulses (820). The detectors output is measured by analyzer (600) which provides information to the controller (700) to turn off or modify the output of the LASER (100) or the AOM drive electronics (305).

The beam splitter (300) can be reconfigured during operation in how it directs the beams (810). In this embodiment of the invention, the controller (700) causes the LASER to pulse repetitively until all of the holes (410) are completely drilled. In this embodiment of the invention, the detector (500) must have spatial resolution (510) to determine when individual holes are complete. The analysis apparatus (600) analyzes the spatial data to determine which holes have drilled through sufficiently. The synchronizing controller (700) uses the output from the analysis apparatus to control the beam splitter so that no beams are directed at holes that have been determined to be complete.

In this embodiment of the invention the beam splitter (300) may be implemented as an acousto-optic modulator driven at a multiplicity of frequencies to split the beam. This may be implemented to create an either one or two dimensional array. Two dimensional arrays are achieved by driving the acousto-optic element in two dimensions, or by using two separate acousto-optic elements, one rotated, preferably by 90°, relative to the other. The detector (500) may be a charge-coupled-device or similar imaging detector. The analyzer (600) may be a hardwired analog processor, a hardwired digital processor, or a programmable processor (including a computer). The synchronizing controller (700) may similarly be hardwired or a programmable processor.

In a preferred embodiment, the beam-splitter (300) is an acousto-optic modulator (AOM) driven by a programmable frequency generator (305). The detector (500) is an imaging charge-coupled device (510) which provides a read out signal which is analyzed by a computer and the computer also performs the synchronization with the programmable frequency generator to control the beamsplitter (300).

In another embodiment of the invention, a LASER scanner repetitively directs pulses from a LASER beam (100) at a sequence of features (410) to be machined. The detector (500) resolves the response of the system in time, and the output of the detector (500) is analyzed in synchronization with the controller (700) and LASER device (100) to determine which response corresponds to which feature. The synchronization controller (700) causes the LASER device (100) to omit pulses directed at those features that are determined to have been completed.

FIGS. 2 and 3 show another embodiment of the invention wherein the LASER beam (800) is directed from feature to feature by a spinning polygonal mirror (310). An electrical photo-detector (520) detects the LASER light (820) transmitted through an opening or feature (410) once it is drilled. An analyzer (600) determines whether the pulses detected are energetic enough to indicate that the corresponding hole (410) is sufficiently drilled. A synchronization controller (700) omits the LASER pulses corresponding to completed holes from subsequent sequences of LASER pulses.

In this version of this embodiment, a detector (320) may be used to synchronize the LASER pulse sequence and the detected signals with the rotation of the mirror (310). The detector (320) may be substituted with or supplemented with an encoder on the rotating assembly of the mirror (310). The detector (32) is preferably an optical detector that detects the LASER beam used for machining or an auxiliary beam generator (330) that is also reflected off of the polygonal mirror (310).

Figure 4:
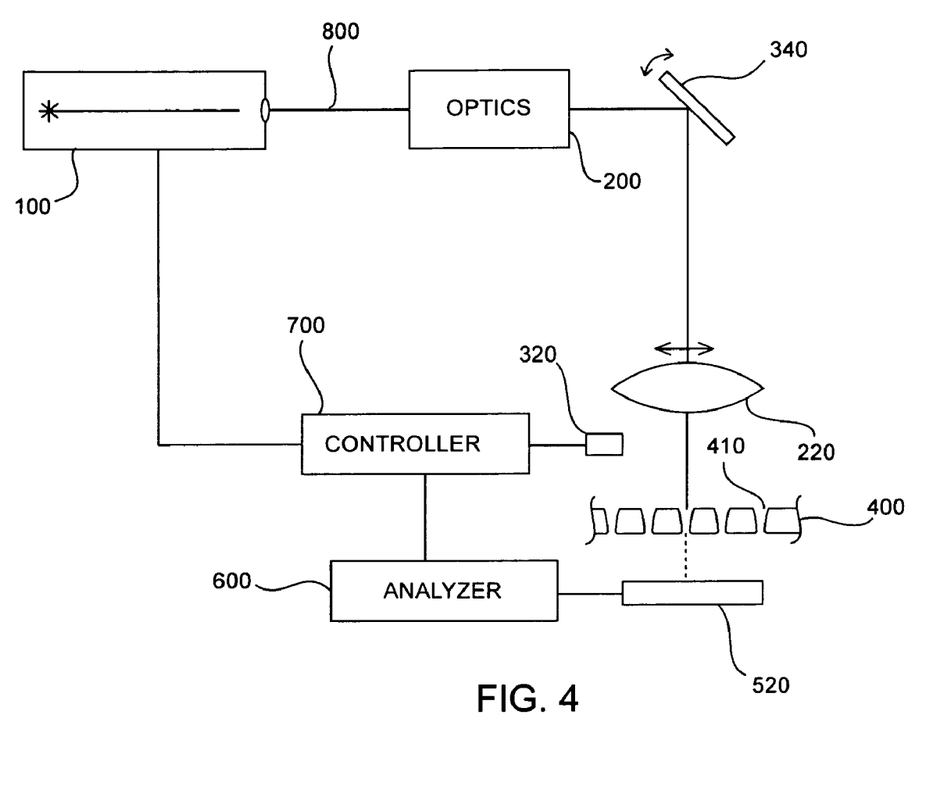
Figure 5:
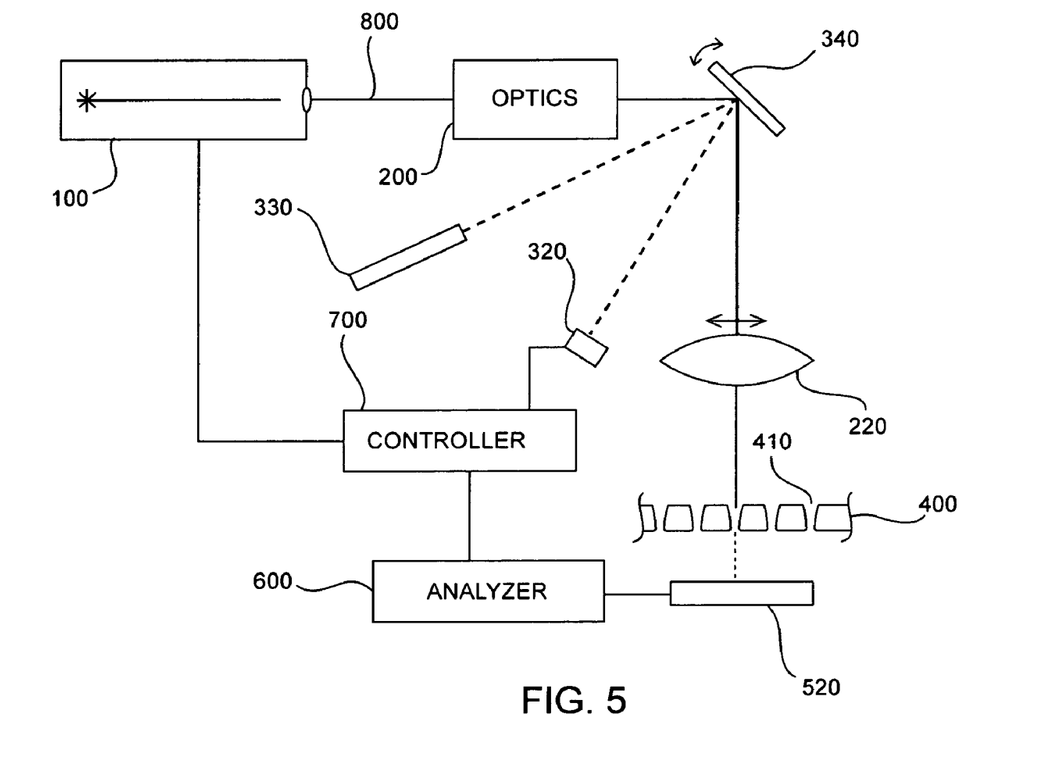

In another embodiment (FIGS. 4, 5), the LASER beam (800) may instead be scanned from feature to feature using an oscillating mirror (340). In this version, the mirror may be a galvanometer (340). Independent of the method of driving the mirror (340), in this version the LASER pulses, detected pulses, and mirror position may also be synchronized by an encoder (optical detector 320) or detecting the machining or an auxiliary beam generator (330).

Figure 6:
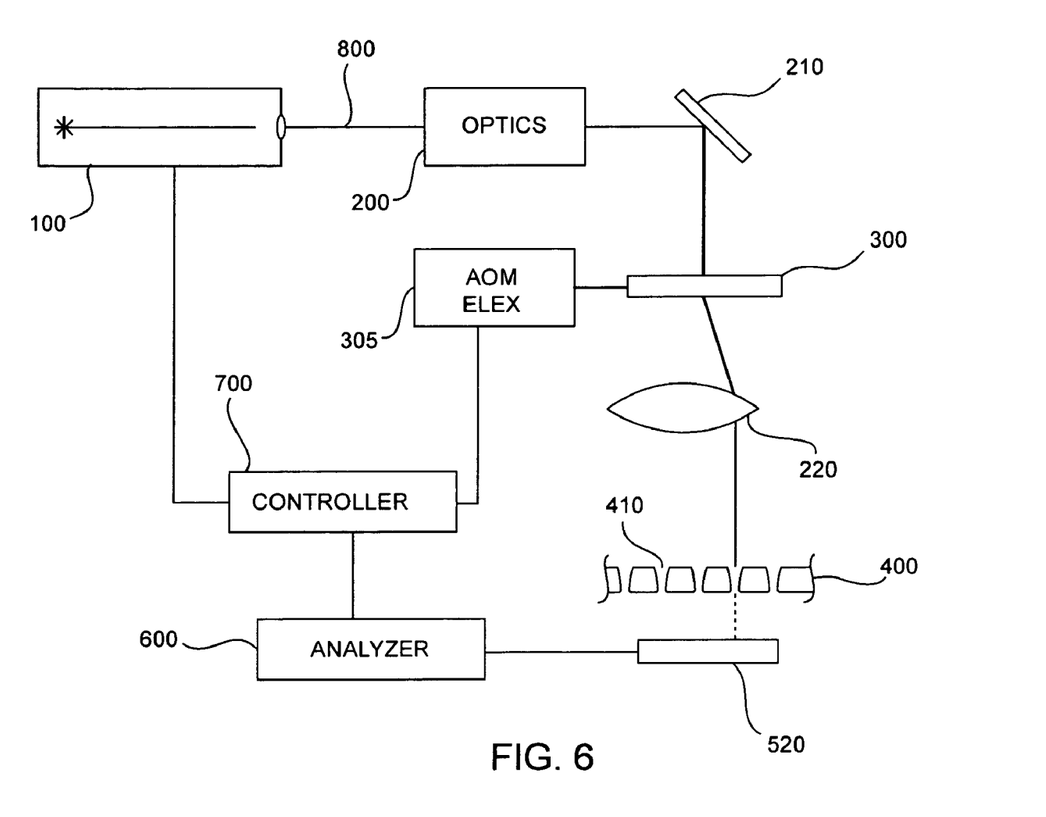
Figure 7:
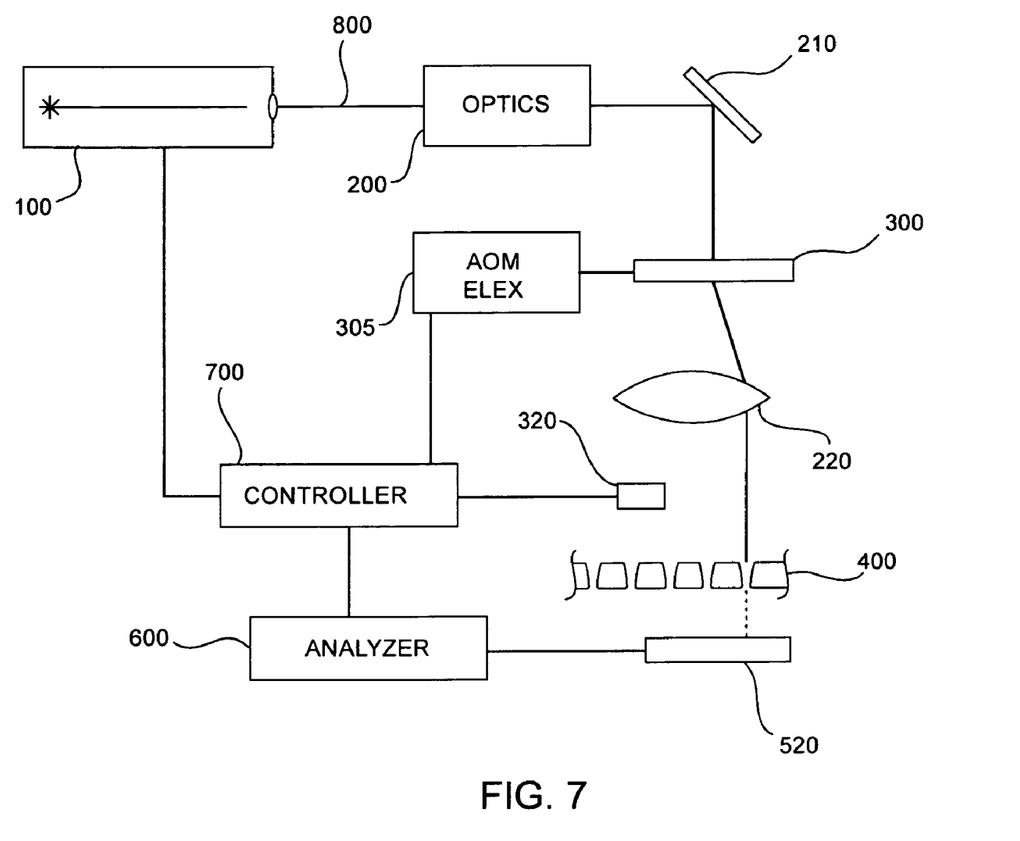

Also in the embodiment where the LASER beam is scanned from feature to feature, the LASER beam may instead be scanned from feature to feature using an acousto-optic element (300) as shown in FIGS. 6 and 7 which is driven at a continuously or discretely varying frequency. In this version, the LASER pulses, and beam position may be synchronized directly with the beam position drive signal or by optically detecting the scanned beam. For the highest level of reproducibility, the LASER pulses and the excitation signal to the acousto-optic element may be phase locked. The acousto-optic modulator may direct only one LASER pulse to the feature (410) before redirecting the beam to the next feature. In another embodiment, the acousto-optic modulator direct pulses at a single feature (410) until the analyzer (600) determines that the feature is complete, and the AOM (300) directs the LASER beam to the next feature to be processed. AOM (300) may be a two dimensional AOM, or two one dimensional AOM. Alternatively, AOM (300) may be a one dimensional AOM, and once a linear array of features have been processed, the part (400) is moved to another position by a stage. In the preferred embodiment, AOM (300) is a one dimensional AOM, and once a linear array of features have been processed, mirror (210) is moved to a new position, allowing the fabrication of a new linear array of features. Mirror (210) can be moved using any of a number of methods, but in the preferred embodiment, mirror (210) is a galvanometer.

One skilled in the art reading this disclosure will understand that any of a number of techniques can be used to scan the beam. It will also be understood that further multiplexing of the beam could be achieved in a number of ways, including using multiple LASERs, using diffractive elements, beams splitters, or the like.

In any version of the embodiment in which the LASER beam is scanned from feature to feature and the detector resolves the system response in time, the detector may be, but is not limited to, an optical detector which detects the transmitted LASER light from the machining beam, an optical detector that detects auxiliary light applied to probe the state of the process, an optical detector that detects some secondary light generated by the process, or an electrical detector that detects some aspect of the process.

In the embodiment of FIGS. 6 and 7 the detector (520) may be a high-speed semiconductor detector with a narrow-band optical response that converts the incident detected light into an electrical signal with voltage proportional to the energy in the light. This kind of detector may be used by combining a narrow-band optical filter with a sensitive, high-speed photodiode read out by a transresistance or charge-integrating amplifier.

In any version of the embodiment in which the LASER beam is scanned from feature to feature and the detector resolves the system response in time, the analysis apparatus (600) may be a data acquisition unit feeding data to a microprocessor or computer for subsequent analysis of the data using computer software, or it may be a hardwired circuit that compares the detector output to a threshold condition and has logic that gates the pulses in the sequence, blocking those that correspond to features that have already achieved the threshold condition.

The embodiment of FIGS. 6 and 7 the analyzer (600) may be a hardwired circuit with a comparator that triggers when the detector output rises above a threshold voltage. The output of the comparator is used to conditionally disable the inputs of series gates that control the transmission of each of the pulses in the repeating series corresponding to the individual features. As the gates are disabled, they cease to transmit the pulses corresponding to that feature until reset for machining the next series of features. In a preferred embodiment, rather than ceasing to transmit the pulses, the laser beam is scanned to the next position that requires a pulse.

In the embodiment wherein the beam is scanned from feature to feature by using an acousto-optic element (300), the controller (700) can, based on results from the analyzer (600), cause the acousto-optic element electronics (305) to modify the excitation to acousto-optic element (300), for example by modifying the frequency, amplitude, phase, frequency width, spectrum etc. of the signal associated with a feature, or skipping the excitation associated with a feature entirely if that feature is determined to be fully processed.

In any version of the embodiment in which the LASER beam is scanned from feature to feature and the detector resolves the system response in time, the synchronization controller (700) may include a trigger that synchronizes the start of the series of LASER pulses with the start of the scan by the scanning apparatus, a pulse series generator with stable timing relative to the scan position of the scanning apparatus, conditional LASER pulse generation depending on previous detector data, and a reset mechanism that terminates pulse generation after (a) a given number of pulses or (b) completion of some number of features as determined by the detector information, or any other control features and methodologies.

In a preferred embodiment, the synchronization controller includes the dedicated gates described as part of the analyzer apparatus, circuitry to repeatedly generate the pulse sequence based on a frequency stabilized oscillator and a trigger based on a beginning of scan signal from the LASER scanner.

In a final embodiment of the invention, the LASER beam is scanned from feature to feature and the detector is an array which detects the status of each of the elements. The detector may be an imaging or non-imaging detector that is sensitive to the light transmitted from the drilling operation of each feature, or may be some other detector with an array of elements used to monitor the different features to be machined. This embodiment may require calibration of the individual elements of the detector to allow the threshold to be set correctly for each one, or conversely, appropriate thresholds may need to be determined for each element.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

In this example, a single-hole LASER drilling process was developed based a 5 kHz LASER pulse rate, and a higher processing speed was desired. Later, a LASER with a 100 kHz pulse rate became available. Rather than increasing the pulse rate on a single feature, the beam can be scanned repeatedly across the work piece at 5 kHz or less using an oscillating mirror (340, FIGS. 4 and 5). The LASER pulses are synchronized with the oscillation of the mirror using a detector (320) with a narrow slit covering the sensitive surface, placed next to the part to be machined. As the beam scans across the slit, the LASER (100) is triggered to pulse in high-energy mode, so that high energy pulses are repeatedly directed to the same set of sequential locations (410). In this way, each of 20 or more different locations are each exposed to 5 kHz or less drilling operations using a single 100 kHz LASER. In the previously developed process, the drilling on a single hole is terminated when a certain amount of LASER processing light is transmitted through the hole after it completely penetrates the material. This light is detected, read out and analyzed by an optical detector (520), an electrical threshold detector, and a logic circuit. To retain the closed-loop feedback characteristic of the process, the optical detector and electrical threshold detector are monitored by a series of logic circuits, with the LASER pulses, motion of the mirror, detector output, and activation of the logic circuits all synchronized to correspond to the sequential locations. Each of the logic circuits can omit any LASER pulses directed at its corresponding feature subsequent to detection of a threshold amount of light being transmitted through that feature. Thus, the process as previously developed is applied to each feature, but the rate of processing is greatly increased.

Example 2

In this example, a single-hole LASER drilling process was developed based on a 5 kHz pulse repetition rate, and a higher processing speed was desired. In order to drill many holes at once, the LASER beam can be split into many beams using an acousto-optic modulator. This splitting can be in one or two dimensions, but one dimensional splitting is simpler and easier to explain and is used in this example (FIG. 1). Each beam (810) is formed by the incident LASER beam (800) interacting with a density variation in the acousto-optic element (300). The density variation results from a sound wave typically generated by driving the acousto-optic element with an electrical signal of an appropriate frequency. Thus each beam corresponds to a frequency and the beam intensity can be adjusted by adjusting the amplitude of the electrical signal at that frequency. All of the signals are combined electrically and applied to the acousto-optic element to generate all of the beams at once. In the previously developed process, the drilling on a single hole is terminated when a certain amount of LASER processing light is transmitted through the hole after it completely penetrates the material. This light is detected, read out and analyzed by an optical detector, an electrical threshold detector, and a logic circuit. To retain the closed-loop feedback characteristic of the process, a linear high speed CCD array detector (500) monitors the light transmitted through the material. The array is read out and an analysis circuit determines whether the light, detected by the elements corresponding to the individual holes (410) to be drilled, has reached threshold. When the light corresponding to a hole does reach threshold, the signal amplitude at the frequency generating the beam machining that hole can be reduced or switched off. Once enough of the holes have been drilled, the LASER pulsing is stopped and the machining on that part is complete. Although in this example, each beam is associated with a single frequency, it will be obvious to one skilled in the art that more complex features can be machined, or better control maintained, by using more complex excitation signals.

Example 3

In this example, 10 holes are drilled at once using a laser pulsing at 100 kHz and directing each pulse sequentially at the 10 holes consecutively. The system described above can be used, but with the synthesizer driving the AOD reprogrammed to multiplex the pulses to the 10 holes in time, using the same pre-programmed sequence for each one. The synthesizer then synchronizes with the laser pulsing and the detector response, tracking which of the 10 holes has been processed to completion and skipping those holes. In either case, the synthesizer returns control to the next level controller in the system once it has completed drilling the 10 holes.

Example 4

In this example, the LASER was a Coherent Avia 355-7000 pulsing at 100 kHz on its internal clock, although repetition rates as low as 5 kHz have been used and higher rates (300 kHz or more) may be desirable. The LASER beam was transported and conditioned by a 5:6 beam expander and spatial filter with 134 mm incident focal length and 25 um pin hole. The beam passed through an Isomet quartz D1129-XY acousto-optic deflector (AOD) and was reflected off of a GSI Lumonics FM3 galvanometer. A final 134 mm focal length projection lens imaged the spot onto the workpiece, which was placed on an automated stage (Aerotech ALS130-100-LTAS with U511 controller). A control computer initiated drilling by triggering an Isomet iDDS, a programmable synthesizer that drives the AOD, and enabled laser pulsing. The iDDS synchronized with the laser pulsing and both modulated the energy in and directed each laser pulse appropriately to drill 10 holes, although as few as a single holes and as many as 50 have been used, in sequence, in a 25 micrometer thick polyimide sheet. Each hole was drilled with a sequence of pulses of varying pulse energy, in a pattern pre-loaded into the iDDS. Nozzles were fabricated using a two step process. For the two step process, the first step comprised application of pulses of largely the same energy to the part for a fixed, predetermined number of pulses. The second step comprised delivery of pulses of largely the same energy to the part until the feedback circuit determined that the fabrication was complete. The polyimide sheet is highly opaque at the 355 nm laser wavelength, and thus 355 nm radiation only began to propagate beyond the membrane once a hole had been formed. The transmitted light passed through a narrow-band filter, which excluded other light generated by fluorescence and plasma emission during the drilling, and fell on an HUV-4000B detector (EG&G Canada) bypassed by a 60 picofarad capacitor and a 60 kilo-ohm resistor, generating an electrical signal proportional to the amount of light energy in each transmitted pulse and short enough to resolve the response to individual pulses. Once the amount of light transmitted per pulse, and thus the electrical signal, reached a certain threshold level, the drilling at that location was terminated, the frequency used to excite the AOM crystal was incremented, moving the beam to the next position, and the sequence was begun for the next hole. After 10 holes were complete (approximately 10-20 ms processing time), the iDDS synthesizer signaled the control system, and t the beam or the part was deflected by in a transverse direction so that the next 10 holes could be drilled adjacent to the previous set. This was repeated until 340 holes were created, in a 10×34 array, and this entire process was repeated several hundred times to make a lot of nozzle arrays. One lot was fabricated using the stage for the transverse movement, resulting in a fabrication time per nozzle of 2.7 seconds. A second lot was fabricated using the galvo for the transverse movement, resulting in a fabrication time of less than 1 second per nozzle.

Energy per pulse, step 1: 1.5 uJ

Pulses in the first step: 18

Energy per pulse, step 2: 0 0.25 uJ

Pulses in the second step were found to range from 100-200 pulses.

The feedback circuit terminated the process when a predefined transmitted energy of about 60 picoJoule/per pulse was achieved.

In this example, nozzles fabricated using the stage had an average exit hole diameter (area equivalent diameter of the hole, as determined by SEM) of 559 nm.

The hole-to-hole diameter standard deviation within a nozzle was 15-30 nm. The standard deviation, between different arrays in the same processing batch, of the average exit hole size of each array was 8 nm. The standard deviation, over many processing batches, of the average hole size of each processing batch is typically between 10 and 30 nm. The time required to fabricate a nozzle array was 2.7 seconds. With the AOD and galvo, drill time was just under 1 second. The average hole size was 595 nm, with a 30 nm standard deviation. The aerosols generated using these nozzles had particle sizes with volume median diameters in the range of 3-4 um, typically around 3.5 um. The standard deviation, between different arrays in the same processing batch, of the average exit hole size of each array was 12 nm. In an experiment using an all mechanical mass-production device, emitted doses were 60% of the packaged dose, with 4% standard deviation. On an optimized research device, the emitted doses were 73% with a 1.5% standard deviation, indicating that the nozzles themselves are of very high quality.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method of machining, comprising:
sequentially applying LASER energy to a multiplicity of areas where a feature is to be machined; and
repeating the sequential application of LASER energy to the areas thereby allowing a multiplicity of features to be machined at essentially the same time;
wherein the LASER is directed from one area to another area by an element chosen from a spinning element, a vibrating element, and an oscillating element;
the method further comprising:
detecting energy directed at the areas;
evaluating feature formation based on detected energy; and
terminating application of LASER energy based on evaluated energy at the multiplicity of areas totaled together.

2. The method of claim 1, wherein a LASER beam applies the energy, an optical element with time-varying characteristics redirects sequential temporal segments of the LASER beam to the multiplicity of areas to be machined, a detector detects a level of machining on each area individually, and an electrical system controlling the LASER eliminates temporal segments of the LASER beam that would have been directed at features for which the machining has been determined to be complete.

3. The method of claim 2, wherein the detector is a photodetector that detects the amount of machining LASER light that is transmitted through the features, and completeness is determined by comparing a peak intensity or total energy of light in a transmitted pulse to a threshold value.

4. A method of machining, comprising the steps of:
spatially separating a beam of energy into a multiplicity of individual energy flows;
directing individual energy flows at a multiplicity of areas to be machined;
evaluating a degree of completion of the machining of individual features at the areas, wherein the separation of the energy is modified to most effectively complete the machining of the multiplicity of features.

5. The method of claim 4, wherein the beam of energy is a LASER, the LASER beam is separated into a multiplicity of beams by an acousto-optic modulator driven at a multiplicity of frequencies, a detection system monitors the individual areas being machined into features, and the drive signal controlling the acousto-optic modulator is modified to achieve the desired machining of the areas into features.

6. The method of claim 5, wherein the beam directed at a particular area is eliminated or redirected when the beam has completed formation of a feature.

7. The method of claim 6, wherein the detector is an array detector, and the transmitted power is monitored simultaneously at each area where the beam is directed.

8. The method of claim 6, wherein the detector is a single detector capable of measuring transmitted power at the multiplicity of areas as a whole by a method comprising:
  (a) directing a plurality of pulses simultaneously to multiple areas on a target;
  (b) directing the beam sequentially to each feature;
  (c) determining at least one property of each feature; and
  (d) modifying the method based on the at least one property determined in (c).

9. The method of claim 8, wherein the modifying in step (d) comprises eliminating power delivered to a subset of the features, and steps (a)-(d) are repeated until all features are determined to be machined to a desired end point.

10. A method of LASER machining a component, comprising the steps of:
creating a LASER beam from a LASER device;
focusing the LASER beam on a surface of a mirror; and
changing the angle of the minor so as to direct the LASER beam to features of a component to be machined;
detecting energy from the reflected beam on the features;
analyzing energy detected and creating a signal based on the analysis; and
sending the signal to the device which controls the LASER beam to thereby control machining of the component with the LASER beam.

11. A method of machining, comprising:
sequentially applying LASER energy to a multiplicity of areas where a feature is to be machined; and
repeating the sequential application of LASER energy to the areas thereby allowing a multiplicity of features to be machined at essentially the same time;
wherein the LASER is directed from one area to another area by an element chosen from a spinning element, a vibrating element, and an oscillating element; the method further comprising:
detecting energy directed at the areas;
evaluating feature formation based on detected energy; and
terminating the energy at individual areas based on energy evaluated at individual areas;
wherein a LASER beam applies the energy, an optical element with time-varying characteristics redirects sequential temporal segments of the LASER beam to the multiplicity of areas to be machined, a detector detects a level of machining on each area individually, and an electrical system controlling the LASER eliminates temporal segments of the LASER beam that would have been directed at features for which the machining has been determined to be complete.

* * * * *

UNITED STATES PATENT AND TRADEMARK OFFICE
CERTIFICATE OF CORRECTION

| | |
|---|---|
| PATENT NO. | : 7,767,930 B2 |
| APPLICATION NO. | : 11/542625 |
| DATED | : August 3, 2010 |
| INVENTOR(S) | : Thor Miller Wilbanks et al. |

It is certified that error appears in the above-identified patent and that said Letters Patent is hereby corrected as shown below:

Column 19:
In claim 10, line 5, please replace "minor" with --mirror--.

Signed and Sealed this
Third Day of May, 2011

David J. Kappos
*Director of the United States Patent and Trademark Office*